(12) United States Patent
Liu et al.

(10) Patent No.: US 10,397,767 B2
(45) Date of Patent: Aug. 27, 2019

(54) NAN FURTHER AVAILABILITY SCHEDULE INDICATIONS

(71) Applicant: Apple Inc., Cupertino, CA (US)

(72) Inventors: Yong Liu, Campbell, CA (US); Christiaan A. Hartman, San Jose, CA (US); Guoqing Li, Cupertino, CA (US); Su Khiong Yong, Palo Alto, CA (US); Lawrie Kurian, San Jose, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 15/341,493

(22) Filed: Nov. 2, 2016

(65) Prior Publication Data

US 2017/0127464 A1    May 4, 2017

Related U.S. Application Data

(60) Provisional application No. 62/249,862, filed on Nov. 2, 2015.

(51) Int. Cl.
*H04W 8/00* (2009.01)
*H04W 76/14* (2018.01)
*H04W 84/12* (2009.01)

(52) U.S. Cl.
CPC ........... *H04W 8/005* (2013.01); *H04W 76/14* (2018.02); *H04W 84/12* (2013.01)

(58) Field of Classification Search
CPC ..... H04W 84/12; H04W 84/18; H04W 80/04; H04W 8/26; H04W 88/06
USPC ........................................................ 370/338
See application file for complete search history.

(56) References Cited

U.S. PATENT DOCUMENTS

| | | | | |
|---|---|---|---|---|
| 9,521,192 B2* | 12/2016 | Qi | .......................... | H04L 67/104 |
| 9,716,992 B2* | 7/2017 | Abraham | .............. | H04W 48/16 |
| 9,723,513 B1* | 8/2017 | Lambert | ........... | H04W 28/0289 |
| 9,820,131 B2* | 11/2017 | Abraham | .............. | H04W 76/10 |

(Continued)

OTHER PUBLICATIONS

Wi-Fi Alliance;"Neighbor Awareness Networking Technical Specification, Version 1.0"; May 1, 2015; 98 pages.

*Primary Examiner* — Gbemileke J Onamuti
*Assistant Examiner* — Sanjay K Dewan
(74) *Attorney, Agent, or Firm* — Meyertons Hood Kivlin Kowert and Goetzel PC; Jeffrey C. Hood; Brian E. Moore

(57) ABSTRACT

In some embodiments, one or more wireless stations operate to configure direct communication with neighboring mobile stations, e.g., direct communication between the wireless stations without utilizing an intermediate access point. Embodiments of the disclosure relate to a mechanism for peer devices to transmit availability schedules beyond 512 time units while continuing to minimize communication overhead. In some embodiments, a wireless station may discover a peer wireless station and transmit extended availability information. In some embodiments, the extended availability information may indicate one or more of an availability interval duration, a bitmap length, and/or a repeat interval of the availability information. In some embodiments, the extended availability information may indicate a maximum number of receivable spatial streams and/or a channel bandwidth. In some embodiments, the extended availability information may include or indicate availability of the wireless station for more than 512 time units.

20 Claims, 8 Drawing Sheets

(56) References Cited

U.S. PATENT DOCUMENTS

| | | | |
|---|---|---|---|
| 9,867,040 B2* | 1/2018 | Marin | H04L 63/0421 |
| 9,999,017 B2* | 6/2018 | Abraham | H04W 56/004 |
| 2014/0119357 A1* | 5/2014 | Abraham | H04W 56/001 |
| | | | 370/338 |
| 2014/0198725 A1* | 7/2014 | Abraham | H04W 76/10 |
| | | | 370/328 |
| 2015/0139213 A1* | 5/2015 | Abraham | H04L 69/28 |
| | | | 370/338 |
| 2015/0172391 A1* | 6/2015 | Kasslin | H04L 67/16 |
| | | | 370/338 |
| 2015/0351018 A1* | 12/2015 | Kim | H04W 48/16 |
| | | | 370/338 |
| 2015/0358889 A1* | 12/2015 | Arora | H04W 40/04 |
| | | | 370/338 |
| 2016/0021560 A1* | 1/2016 | Reshef | H04W 24/10 |
| | | | 370/338 |
| 2016/0080511 A1* | 3/2016 | Baum | H04L 67/24 |
| | | | 370/338 |
| 2016/0150465 A1 | 5/2016 | Jung et al. | |
| 2016/0183171 A1* | 6/2016 | Hareuveni | H04W 64/00 |
| | | | 370/328 |
| 2016/0219498 A1* | 7/2016 | Abraham | H04W 48/16 |
| 2016/0242056 A1* | 8/2016 | Patil | H04W 76/14 |
| 2016/0270069 A1* | 9/2016 | Huang | H04W 74/006 |
| 2016/0286398 A1 | 9/2016 | Abraham et al. | |
| 2017/0026995 A1* | 1/2017 | Huang | H04W 72/1278 |

* cited by examiner

FIG. 4
*(Prior Art)*

| Further Availability Map Attribute (502) | | | |
|---|---|---|---|
| Attribute ID (512) | Length (522) | Map ID (532) | Availability Entry List (504) |

FIG. 5A
*(Prior Art)*

| Availability Entry List (504) | | | |
|---|---|---|---|
| Entry Control (506) | Operating Class (514) | Channel Number (524) | Availability Intervals Bitmap (534) |

FIG. 5B
*(Prior Art)*

| Entry Control (506) | |
|---|---|
| Availability Interval Duration (516) | Reserved (6 bits) (526) |

FIG. 5C
*(Prior Art)*

| P2P Operation Attribute (508) | | | | | |
|---|---|---|---|---|---|
| Attribute ID (518) | Length (528) | P8P Device Role (538) | MAC Address (548) | Map Control (510) | Availability Intervals Bitmap (568) |

FIG. 5D
*(Prior Art)*

| Map Control (510) | | | |
|---|---|---|---|
| Map ID (520) | Availability Interval Duration (530) | Repeat (540) | Reserved (1 bit) (550) |

FIG. 5E
*(Prior Art)*

| WLAN Infrastructure Attribute (552) | | | | | |
|---|---|---|---|---|---|
| Attribute ID (554) | Length (556) | BSSID (558) | MAC Address (560) | Map Control (570) | Availability Intervals Bitmap (564) |

FIG. 5F
*(Prior Art)*

| Map Control (570) | | | |
|---|---|---|---|
| Map ID (572) | Availability Interval Duration (574) | Repeat (576) | Reserved (1 bit) (548) |

FIG. 5G
*(Prior Art)*

| Extended Further Availability Map Attribute (600) |||||
|---|---|---|---|---|
| Attribute ID (602) | Length (604) | Map Control (606) | DW Info (608) | Extended Availability Entry List (610) |

*FIG. 6A*

| Map Control (606) |||
|---|---|---|
| Map ID (616) | DW Info Present (626) | Reserved (636) |

*FIG. 6B*

| DW Info (608) ||||
|---|---|---|---|
| Overwrite (618) | 2.4G DW (628) | 5G DW (638) | Reserved (648) |

*FIG. 6C*

| Extended Availability Entry List (610) ||||||
|---|---|---|---|---|---|
| Entry Length (620) | Bitmap Control (630) | Availability Intervals Bitmap (640) | Operating Class (650) | Channel Number (660) | Operating Mode (670) |

*FIG. 6D*

| Bitmap Control (630) |||||
|---|---|---|---|---|
| Availability Interval Duration (682) | Reserved (684) | Bitmap Offset (686) | Bitmap Length (688) | Repeat Interval (690) |

*FIG. 6E*

| Operating Mode (670) ||||
|---|---|---|---|
| Primary (672) | Max Rx Streams (674) | Reserved (676) | Channel Bandwidth (678) |

*FIG. 6F*

| Operation Attribute (700) | | | | | |
|---|---|---|---|---|---|
| Attribute ID (702) | Length (704) | Operation Fields (706) | FA Control (708) | Bitmap Control (710) | Availability Intervals Bitmap (712) |

*FIG. 7A*

| FA Control (708) | | |
|---|---|---|
| Type (718) | Map ID (728) | Reserved (738) |

*FIG. 7B*

NAN FURTHER AVAILABILITY SCHEDULE INDICATIONS

PRIORITY DATA

This application claims benefit of priority to U.S. Provisional Application Ser. No. 62/249,862, titled "NAN Further Availability Schedule Indications", filed Nov. 2, 2015, by Yong Liu, Christiaan A. Hartman, Guoqing Li, Su Khiong Yong, and Lawrie Kurian, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems Wi-Fi mobile stations are able to communicate directly with each other without using an intermediate access point. However, improvements in the operation of such devices are desired, such as in setup and coordination of the communication between such devices.

SUMMARY

Some embodiments described herein relate to systems and methods for peer devices to transmit availability schedules beyond 512 time units (TUs) while continuing to minimize communication overhead.

Some embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as any or all of the methods described herein.

In some embodiments, one or more wireless stations operate to configure direct communication with neighboring mobile stations, e.g., direct communication between the wireless stations without utilizing an intermediate access point. Embodiments of the disclosure relate to a mechanism for peer devices to transmit availability schedules beyond 512 time units while continuing to minimize communication overhead. In some embodiments, a wireless station may discover a peer wireless station and transmit, to the peer wireless station, extended availability information. In some embodiments, the extended availability information may be transmitted via an extended availability attribute. In some embodiments, the extended availability information may indicate one or more of an availability interval duration, a bitmap length, and/or a repeat interval of the availability information. In some embodiments, the extended availability information may indicate a maximum number of receivable spatial streams and/or a channel bandwidth. In some embodiments, the extended availability information may include or indicate availability of the wireless station for more than 512 time units.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 4 illustrates an example of further availability attributes, according to existing implementation.

FIGS. 5A-5G further illustrate various fields for further availability attributes defined by NAN 1.0, according to existing implementations.

FIG. 6A illustrates an example of an extended further availability map attribute, according to some embodiments.

FIG. 6B illustrates an example of a map control field, according to some embodiments.

FIG. 6C illustrates an example of a discovery window information field, according to some embodiments.

FIG. 6D illustrates an example of an extended availability entry list field, according to some embodiments.

FIG. 6E illustrates an example of a bitmap control field, according to some embodiments.

FIG. 6F illustrates an example of an operating mode field, according to some embodiments.

FIG. 7A illustrates an example of an operation attribute, according to some embodiments.

FIG. 7B illustrates an example of a further availability control field, according to some embodiments.

Figure 1:
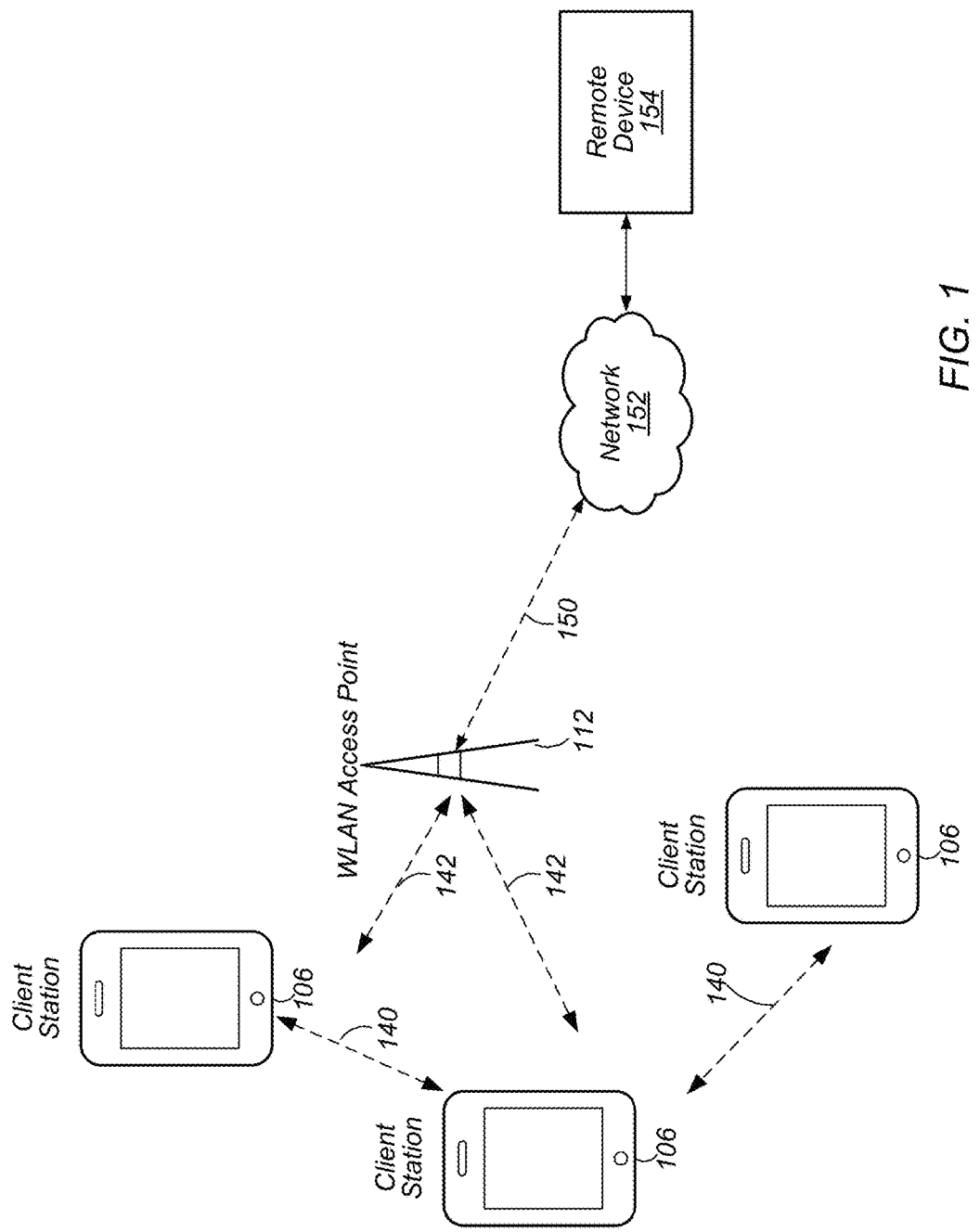
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ Play Station Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to discover a neighboring peer wireless device, e.g., via peer-to-peer Wi-Fi communications and transmit, to the neighboring peer wireless device, extended availability information. In some embodiments, the extended availability information may be transmitted via an extended availability attribute. In some embodiments, the extended availability information may indicate one or more of an availability interval duration, a bitmap length, and/or a repeat interval of the availability information. In some embodiments, the extended availability information may indicate a maximum number of receivable spatial streams and/or a channel bandwidth. In some embodiments, the extended availability information may include or indicate availability of wireless device 106 for more than 512 time units.

Figure 2:
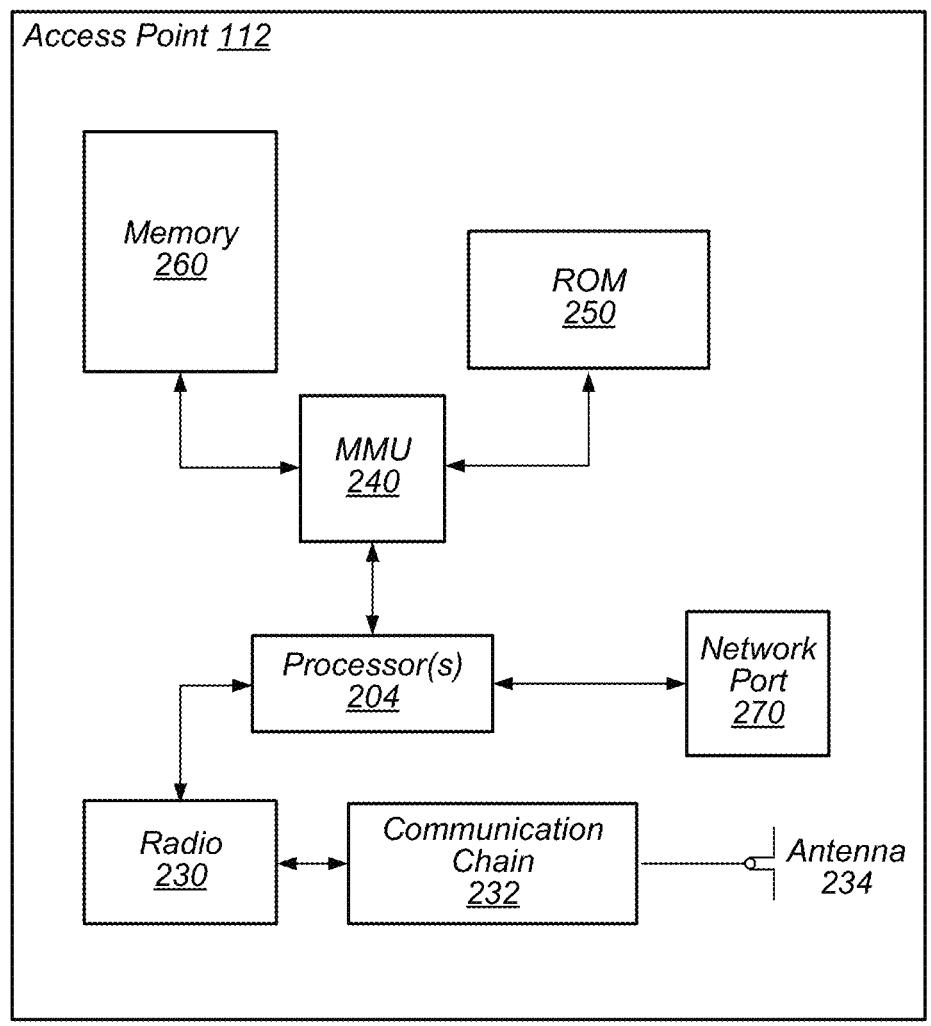
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to discover a neighboring peer wireless station, e.g., via peer-to-peer Wi-Fi communications, and transmit, to the neighboring peer wireless station, extended availability information. In some embodiments, the extended availability information may be transmitted via an extended availability attribute. In some embodiments, the extended availability information may indicate one or more of an availability interval duration, a bitmap length, and/or a repeat interval of the availability information. In some embodiments, the extended availability information may indicate a maximum number of receivable spatial streams and/or a channel bandwidth. In some embodiments, the extended availability information may include or indicate availability of AP 112 for more than 512 time units.

Figure 3:
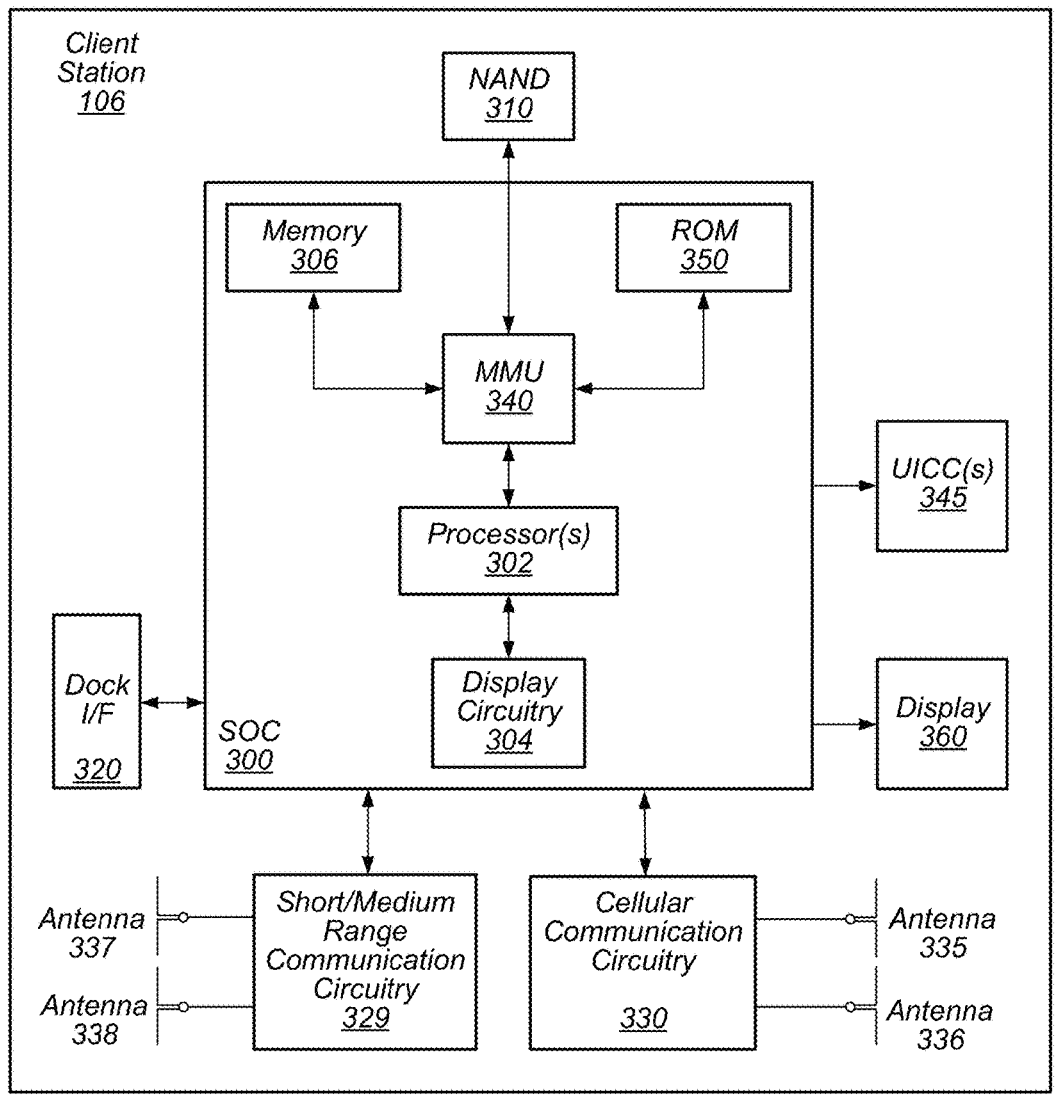
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to discover a neighboring peer wireless station, e.g., via peer-to-peer Wi-Fi communications, and transmit, to the neighboring peer wireless station, extended availability information. In some embodiments, the extended availability information may be transmitted via an extended availability attribute. In some embodiments, the extended availability information may indicate one or more of an availability interval duration, a bitmap length, and/or a repeat interval of the availability information. In some embodiments, the extended availability information may indicate a maximum number of receivable spatial streams and/or a channel bandwidth. In some embodiments, the extended availability information may include or indicate availability of client station 106 for more than 512 time units.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods for a NAN device to transmit extended further availability to peer NAN devices.

Further Availability Attribute

Figure 4:
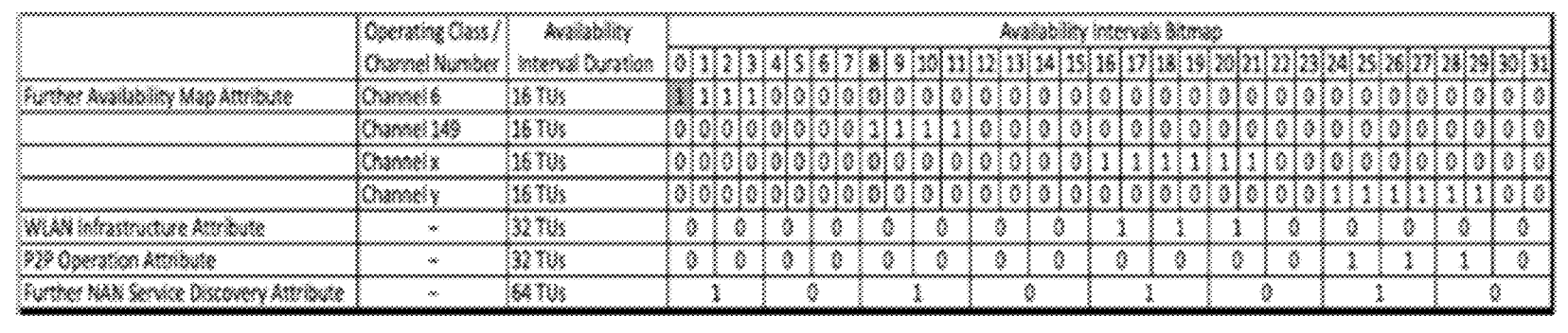

NAN 1.0 defines further availability attributes that allow a NAN device to transmit a further availability schedule for up to 512 time units (TUs). FIG. 4 illustrates an example of further availability attributes, according to existing implementation. As illustrated, the further availability attributes include a further availability map attribute, and one or more operation attributes, such as a WLAN infrastructure attribute, peer-to-peer (P2P) operation attribute, and a further NAN service discovery attribute. The further availability map attribute includes the NAN device's availability intervals bitmap for channel numbers, e.g., channel numbers 6, 149, x, and y for 512 TUs (e.g., each of the entries cover 16 TUs). The WLAN infrastructure attribute includes the NAN device's availability intervals bitmap for WLAN infrastructure communications for 512 TUs. The P2P operation attribute includes the NAN device's availability intervals bitmap for P2P operations for 512 TUs. Finally, the further NAN service discovery attribute includes the NAN device's availability intervals bitmap for further service discovery. Hence, a peer NAN device receiving the further availability attributes may cross-check individual operation attributes against the further availability map attribute and derive the further availability channels and time intervals for an individual operation.

FIGS. 5A-5G further illustrate various fields for further availability attributes defined by NAN 1.0, according to existing implementations. For example, as illustrated by FIG. 5A, a further availability map attribute 502 includes fields such as attribute identifier (ID) 512, length 522, map ID 532, and availability entry list 504. As illustrated by FIG. 5B, availability entry list field 504 includes fields such as entry control 506, operating class 514, channel number 524, and availability intervals bitmap 534 for a channel specified in the channel number field. Further, as illustrated by FIG. 5C, entry control field 506 includes an availability interval duration field 516 and a reserved field 526 that is 6 bits long.

As another example, as illustrated by FIG. 5D, the P2P operation attribute 508 includes fields such as attribute ID 518, length 528, P2P device role 538, medium access control (MAC) address 548, map control 510, and availability intervals bitmap 568 for P2P operations. As illustrated by FIG. 5E, map control field 510 includes fields such as map ID 520, availability interval duration 530, repeat 540, and reserved field 550 that is 1 bit long. As a further example, as illustrated by FIG. 5F, the WLAN infrastructure attribute 552 includes fields such as attribute ID 554, length 556, BSSID 558, MAC address 560, map control 570, and an availability intervals bitmap 564 for WLAN infrastructure communications. Further, as illustrated by FIG. 5G, map control field 570 includes fields such as map ID 572, availability interval duration 574, repeat 576, reserved field 548 that is 1 bit long.

NAN 1.0 limits the further availability attribute availability interval to 512 TUs, which may not be sufficient for some datapath operations. Further, under NAN 1.0, a NAN device cannot transmit channel bandwidth and/or maximum number of spatial streams that the NAN device may receive.

Extended Further Availability Attribute

According to embodiments described herein, extended further availability attributes may be implemented to enable a device (e.g., a NAN device such as client station 106) to transmit extended further availability information to peer devices (e.g., peer NAN devices). In some embodiments, the device may transmit, via the extended further availability attributes, extended availability information for availability intervals beyond 512 TU, in addition to transmitting additional information such as channel bandwidth and a maximum number of receivable spatial streams. In some embodiments, the extended further availability attribute may be interoperable with existing NAN devices. In other words, according to some embodiments described herein, existing devices implementing the further availability attribute as defined by NAN 1.0 (e.g., legacy NAN devices) may receive the extended further availability attribute and interpret it as the further availability attribute. Thus, embodiments may allow for backward compatibility with legacy NAN devices. Further, in some embodiments, the extended further availability attribute, although configured to include additional information, may be further configured to minimize communication overhead. In other words, the extended further availability attribute may minimize communication overhead associated with transmission of additional information (e.g., extended availability intervals, channel bandwidth, maximum number of receivable spatial streams).

FIG. 6A illustrates an example of an extended further availability map attribute, according to some embodiments. As illustrated, an extended further availability map attribute 600 may include fields (or information bits or data) such as attribute identifier (ID) 602, length 604, map ID 606, discovery window (DW) information (Info) 608, and extended availability entry list 610. Note that each field of the extended further availability map attribute may include further fields (or information bits or data) defining specific aspects of a device's further availability. In addition, the fields (or information bits or data) described herein are exemplary only and may or may not all be included in an extended (or enhanced) further availability map attribute. Additionally, additional fields (or information bits or data) further defining a device's further availability may be included in an extended (or enhanced) further availability map attribute. Further, an extended availability map attribute may also include fields that further define a device's further availability.

For example, FIG. 6B illustrates an example of a map control field, according to some embodiments. As illustrated, map control field 606 may include fields such as any or all of map ID 616, DW information (info) present 626, and/or reserved 636. Note that the map control field may be an additional field or may be an alternative to another field, such as a map ID field, or may include a map ID field, such as map ID field 616.

As another example, FIG. 6C illustrates an example of a discovery window information field, according to some embodiments. As illustrated, discovery window information (DW info) field 608 may include fields such as any or all of overwrite 618, 2.4 Gigahertz discovery window (or "2.4 G DW") 628, 5 Gigahertz discovery window (or "5 G DW") 638, and/or reserved field 648. In some embodiments, discovery window information field 608 may be 1 byte. In some embodiments overwrite field 618 may be 1 bit, 2.4 G DW field 628 may be 3 bits, 5 G DW field 638 may be 3 bits, and reserved field 648 may be 1 bit. However, any or all of the fields may be characterized by other sizes. In some embodiments, if the overwrite field is set to 1, the discovery window availability indicated by the discovery window information field may override discovery window availabilities indicated in other fields (or bitmaps). In addition, in some embodiments, if the overwrite field is set to 0, the discovery window availability indicated by the discovery window information field may be overwritten by discovery window availabilities indicated in other fields (or bitmaps).

In some embodiments, 2.4 G DW field 628 may indicate a period when a device may be present in the 2.4 Gigahertz channel's discovery windows. The period may be 0, 1, 2, 4, 8, or 16 in some embodiments. Note that a device may be available (or present) during each first discovery window out of sixteen discovery windows for at least one map. In other words, for discovery windows 0 (DW0) to 15 (DW15), repeating, a device may be present for at least each DW0 for at least one map.

In some embodiments, 5 G DW field 638 may indicate a period when a device may be present in the 5 Gigahertz channel's discovery windows. The period may be 0, 1, 2, 4, 8, or 16 in some embodiments.

Note that in some embodiments, if the discovery window information field is not present, discovery window availability may be indicated by bitmaps in the further availability map attributes or extended further availability map attribute.

As a further example, FIG. 6D illustrates an example of an extended availability entry list field, according to some embodiments. As illustrated, extended availability entry list field 610 may include fields such as any or all of entry length (or "entry len") 620, bitmap control 630, availability intervals bitmap 640, operating class 650, channel number 660, and/or operating mode 670. In some embodiments, entry length field 620 may indicate a number of bytes added after an availability intervals bitmap. In some embodiments, entry length field 620 may be implemented to allow for further extension to add more fields after the bitmap.

FIG. 6E illustrates an example of a bitmap control field, according to some embodiments. As illustrated, bitmap control field 630, in some embodiments, may include fields such as any or all of availability interval duration 682, reserved 684, bitmap offset 686, bitmap length (or "bitmap len") 688, and/or repeat interval 690. In some embodiments, bitmap control field 630 may include 3 bytes. In embodiments, availability interval duration field 682 may be 2 bits, reserved field 684 may be 4 bits, bitmap offset field 686 may be 6 bits, bitmap length field 688 may be 6 bits, and repeat interval field 690 may be 6 bits. However, any or all of the fields may be characterized by other sizes. Note that one further availability slot may be 16 TU and one further availability block may be 128 TU. In addition, the bitmap offset may be defined as a number of further availability blocks from a start of an immediately previous discovery window (e.g., DW0). In other words, the bitmap offset may be defined as a number of further availability blocks from a start of an immediately previous discovery window.

Note that DW0 may indicate discovery windows that repeat, e.g., every 16 discovery window intervals and a first (or initial) DW0 may correspond to NAN clock 0. In some embodiments, the bitmap offset may be up to sixty-four (64) further availability blocks (512 further availability slots or 8192 TU). Note that in at least some embodiments, further availability slots skipped by the bitmap offset or not covered by the availability intervals bitmap may be assumed to be zero (or unavailable) in order to reduce communication overhead. Alternatively or in addition, a reserved bit (e.g., in reserved field 684) in the bitmap control field may be used to indicate whether the further availability slots not covered by the availability intervals bitmap may be assumed to be zero (or unavailable) or one (available). In some embodiments, the bitmap length may be up to 8192 TU (e.g., $2^6$=64 bytes=512 bits (or further availability time slots)). In some embodiments, the repeat interval may define a period that the bitmap may repeat by the unit of further availability block. The period may be up to 8192 TU. In addition, in some embodiments, the availability interval durations may define a number of time units (TUs) per bit. For example, 00 may represent 16 TU per bit, 01 may represent 32 TU per bit, 10 may represent 64 TU per bit, and 11 may, e.g., be reserved for future expansion or enhancement.

FIG. 6F illustrates an example of an operating mode field, according to some embodiments. As illustrated, operating mode field 670 may include fields such as any or all of primary 672, maximum receivable streams (or "max RX streams") 674, reserved 676, and/or channel bandwidth (channel BW) 678. In some embodiments, operating mode field 670 may include one byte. In some embodiments, primary field 672 may be 1 bit, maximum receivable streams field 674 may be 3 bits, reserved field 676 may be 1 bit, and channel bandwidth field 678 may be three bits. However, any or all of the fields may be characterized by other sizes. In some embodiments where the maximum number of receivable streams is n, the primary field may indicate that a device may receive n streams when the primary field is 0 and when the primary field is 1, the primary field may indicate that the device may receive n less any concurrent receiving streams, which may be indicated by other further availability map attributes, extended further availability attributes, and/or unaligned schedules, if any. In addition, in some embodiments, a device may include multiple availability entries for a channel, but with different operating modes and/or different bitmaps.

In some embodiments, in addition to an extended further availability map attribute, one or more operation attributes may be implemented. In such embodiments, the extended further availability map attribute may specify (or indicate) a 2-dimensional channel/time resource allocation while each of the operation attributes may specify a particular operation's time domain resource allocation. Thus, when a device receives both the extended further availability map attribute and the operation attributes, the device may compare a time bitmap in each of the operation attributes with the 2-dimensional channel/time bitmap in the extended availability map attribute to determine operating channel information for a particular operation.

FIG. 7A illustrates an example of an operation attribute, according to some embodiments. As illustrated, operation attribute 700 may include fields such as any or all of attribute identifier (ID) 702, length 704, operation fields 706 (specific to operations), further availability control (FA control) 708, bitmap control 710, and/or availability intervals bitmap 712. In some embodiments, further availability control field 708 may be 2 bytes.

FIG. 7B illustrates an example of a further availability control field, according to some embodiments. As illustrated, further availability control field 708, in some embodiments, may include fields such as any or all of type 718, map identifier (ID) 728, and/or reserved 738. In some embodiments, type field 718 may be 2 bits, map ID field 728 may be 4 bits, and reserved field 738 may be 2 bits. However, any or all of the fields may be characterized by other sizes.

In some embodiments, type field 718 may indicate whether a device may be present based on an indicated further availability schedule. In some embodiments, type field bitmaps 00, 01, and 11 may be implemented to indicate commitment levels of a transmitting device to a receiving device for the indicated further availability schedule. In addition, bitmap 10 may, e.g., be reserved.

For example, if type field 718 has a bitmap (or value) of 00, an indicated further availability schedule may be a proposal and the device may not be present based on the indicated further availability schedule. In addition, if type field has a bitmap of 01, an indicated further availability schedule may be a conditional commitment (e.g., the device may be conditionally committed) and the device may be present at overlapped further availability slots between the device's and a peer device's (e.g., a receiver) further availability schedule. In some implementations, such a conditional commitment may only apply to a unicast further availability schedule. Further, if the type field has a bitmap of 11, an indicated further availability schedule may be a full commitment and the device may be present at all further availability slots of the indicated further availability schedule.

Note that in some embodiments, a further availability schedule indicated by an operation attribute may be started from an immediately previous DW0 and the further availability schedule may be assumed to be repeated until updated explicitly by a new further availability schedule. In addition, in some embodiments a further availability schedule may be extend to include a list of further availability control, map ID, bitmap control, and availability intervals bitmap. Additionally, in some embodiments, a count down field may be added to the further availability control field. The count down field may indicate a number of remaining discovery window intervals (or DW0 intervals) before the further availability schedule becomes valid (or starts).

In some embodiments, to maintain compatibility with legacy NAN devices, the extended availability entry may be appended (or added) after all legacy availability entries. For example, in NAN 1.0, the value (or bitmap) of 11 for the first two bits of the entry control field is reserved. Thus, in some embodiments, with the first two bits of the entry control field having a 11 value (or bitmap), legacy NAN devices may ignore (or disregard) the entry control field as well as all remaining fields in the attribute. Extended availability entries can thus be appended after all legacy availability entries by setting the first two bits of the entry control field to 11. In some embodiments, the discovery window information field may be appended to the end of the attribute with the first two bits of the filed set to 11.

Figure 8A:
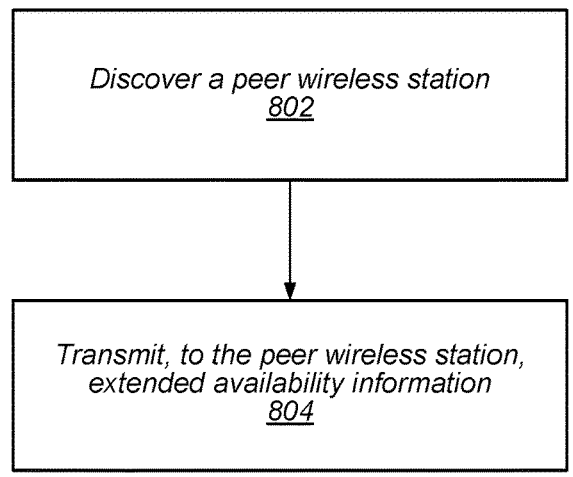
FIGS. 8A-8B illustrate block diagrams of examples of methods for transmitting extended availability information, according to some embodiments.
Figure 8B:
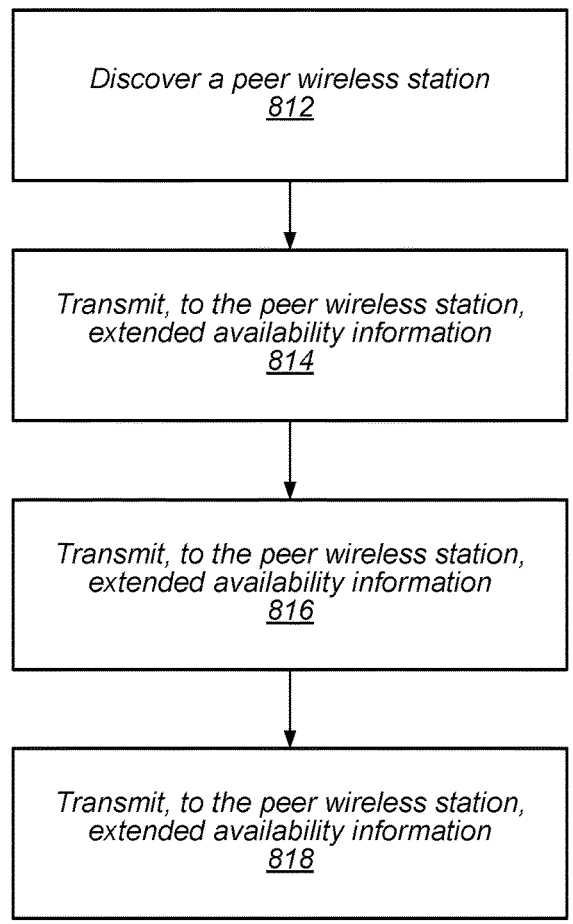

FIGS. 8A-8B illustrate block diagrams of examples of methods for transmitting extended availability information, according to some embodiments. The methods shown in FIGS. 8A-8B may be used in conjunction with any of the systems or devices shown in the above Figures, among other devices. In various embodiments, some of the method elements shown may be performed concurrently, in a different order than shown, or may be omitted. Additional method elements may also be performed as desired. As shown, these methods may operate as follows.

Turning to FIG. 8A, at 802, a peer wireless station may be discovered. In some embodiments, discovery may include receiving one or more discovery beacons from the peer wireless station, e.g., in a discovery window. In some embodiments, the peer wireless station may be discovered via peer-to-peer Wi-Fi communications, e.g. according to a Wi-Fi peer-to-peer protocol such as Wi-Fi direct and/or NAN.

At 804, transmit, to the peer wireless station, extended availability information. In some embodiments, the extended availability information may be transmitted via an extended availability attribute. In some embodiments, the extended availability information may indicate one or more of an availability interval duration, a bitmap length, and/or a repeat interval of the availability information. In some embodiments, the extended availability information may indicate a maximum number of receivable spatial streams and/or a channel bandwidth. In some embodiments, the extended availability information may include or indicate availability of the wireless station for more than 512 time units.

In some embodiments, the extend availability attribute may include a field indicating the maximum number of receivable spatial streams. In some embodiments, the extend availability attribute may include one or more of a field indicating the availability interval duration, a field indicating the bitmap length, and/or a field indicating the repeat interval. In some embodiments, the extended availability attribute includes a field indicating the channel bandwidth. In some embodiments, the extended availability attribute may include a filed indicating whether channel specific further availability information is available. In some embodiments, the extended availability attribute includes a filed indicating periods of further availability of the wireless station for a channel.

In some embodiments, the extended availability attribute may include an extended availability entry list. The extended availability entry list may include one or more of an entry length field, a bitmap control field, an availability intervals bitmap, an operating class field, a channel number field, and/or an operating mode field.

Turning to FIG. 8B, at 812, a peer wireless station may be discovered. In some embodiments, discovery may include receiving one or more discovery beacons from the peer wireless station, e.g., in a discovery window. In some embodiments, the peer wireless station may be discovered via peer-to-peer Wi-Fi communications, e.g. according to a Wi-Fi peer-to-peer protocol such as Wi-Fi direct and/or NAN.

At 814, a common discovery window for exchange of synchronization packets and service discovery frames (SDFs) may be negotiated with a peer wireless station.

At 816, synchronization packets may be exchanged with the peer wireless station during the common discovery window.

At 818, transmit, to the peer wireless station, extended availability information. In some embodiments, the extended availability information may be transmitted via an extended availability attribute. In some embodiments, the extended availability information may indicate one or more of an availability interval duration, a bitmap length, and/or a repeat interval of the availability information. In some embodiments, the extended availability information may indicate a maximum number of receivable spatial streams and/or a channel bandwidth. In some embodiments, the extended availability information may include or indicate availability of the wireless station for more than 512 time units.

In some embodiments, the extend availability attribute may include a field indicating the maximum number of receivable spatial streams. In some embodiments, the extend availability attribute may include one or more of a field indicating the availability interval duration, a field indicating the bitmap length, and/or a field indicating the repeat interval. In some embodiments, the extended availability attribute includes a field indicating the channel bandwidth. In some embodiments, the extended availability attribute may include a filed indicating whether channel specific further availability information is available. In some embodiments, the extended availability attribute includes a filed indicating periods of further availability of the wireless station for a channel.

In some embodiments, the extended availability attribute may include an extended availability entry list. The extended availability entry list may include one or more of an entry length field, a bitmap control field, an availability intervals bitmap, an operating class field, a channel number field, and/or an operating mode field.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
    at least one antenna;
    at least one radio configured to perform Wi-Fi communication;
    at least one processor coupled to the at least one radio,
        wherein the wireless station is configured to perform voice and/or data communications;
    wherein the at least one processor is configured to cause the wireless station to:
        discover a peer wireless station via peer-to-peer Wi-Fi communications; and
        negotiate, with the peer wireless station, a common discovery window for exchange of synchronization packets and service discovery frames (SDFs);
        exchange, during the common discovery window, synchronization packets with the peer wireless station; and
        transmit, to the peer wireless station during the common discovery window, extended availability information via an extended availability attribute comprised in a first SDF, wherein the extended availability information indicates an availability interval duration, a bitmap length, and a repeat interval of the availability information, and wherein the extended availability attribute includes a field indicating a maximum number of spatial streams receivable by the wireless station.

2. The wireless station of claim 1,
    wherein the extended availability information includes availability for more than 512 time units.
3. The wireless station of claim 1,
    wherein the extended availability attribute includes an extended availability entry list.
4. The wireless station of claim 3,
    wherein the extended availability entry list includes one or more of:
        an entry length field;
        a bitmap control field;
        an availability intervals bitmap;
        an operating class field;
        a channel number field; or
        an operating mode field.
5. The wireless station of claim 1,
    wherein the extended availability attribute includes one or more of:
        a field indicating the availability interval duration;
        a field indicating the bitmap length; or
        a field indicating the repeat interval.
6. The wireless station of claim 1,
    wherein the extended availability attribute includes a field indicating channel bandwidth.
7. The wireless station of claim 1,
    wherein the extended availability attribute includes a field indicating whether channel specific further availability information is available.
8. The wireless station of claim 1,
    wherein the extended availability attribute includes a field indicating periods of further availability of the wireless station for a channel.
9. An apparatus, comprising:
    a memory; and
    at least one processor in communication with the memory;
    wherein the at least one processor is configured to:
        discover a peer wireless station via peer-to-peer Wi-Fi communications;
        negotiate, with the peer wireless station, a common discovery window for exchange of synchronization packets and service discovery frames (SDFs);
        exchange, during the common discovery window, synchronization packets with the peer wireless station; and
        receive, from the peer wireless station during the common discovery window, extended availability information via an extended availability attribute comprised in a first SDF, wherein the extended availability information indicates a maximum number of spatial streams receivable by the apparatus.
10. The apparatus of claim 9,
    wherein the extended availability attribute includes an extended availability entry list, wherein the extended availability entry list includes one or more of:
        an entry length field;
        a bitmap control field;
        an availability intervals bitmap;
        an operating class field;
        a channel number field; or
        an operating mode field.
11. The apparatus of claim 9,
    wherein the extended availability attribute includes one or more of:
        a field indicating an availability interval duration;
        a field indicating a bitmap length; or
        a field indicating a repeat interval.

12. The apparatus of claim 9, wherein the extended availability attribute includes a field indicating channel bandwidth.

13. The apparatus of claim 9, wherein the extended availability attribute includes a field indicating periods of further availability of the peer station for a channel.

14. The apparatus of claim 9, wherein the extended availability attribute includes a field indicating whether channel specific further availability information is available.

15. A non-transitory computer readable memory medium storing program instructions executable by a processor of a wireless station to:
discover at least one peer wireless station via peer-to-peer Wi-Fi communications;
generate instructions to negotiate, with the peer wireless station, a discovery window for exchange of synchronization packets and service discovery frames (SDFs);
generate instructions to exchange, during the discovery window, synchronization packets with the at least one peer wireless station;
generate extended availability information for the wireless station, wherein the extended availability information indicates an availability interval duration, a repeat interval of the extended availability information, and a field indicating a maximum number of spatial streams receivable by the wireless station;
and
generate instructions to transmit, via a first SDF during the discovery window, the extended availability information via an extended availability attribute.

16. The non-transitory computer readable memory medium of claim 15, wherein the extended availability information includes availability for more than 512 time units.

17. The non-transitory computer readable memory medium of claim 15, wherein the extended availability attribute includes one or more of:
a field indicating the availability interval duration;
a field indicating a bitmap length; or
a field indicating the repeat interval.

18. The non-transitory computer readable memory medium of claim 15, wherein the extended availability attribute includes a field indicating channel bandwidth.

19. The non-transitory computer readable memory medium of claim 15, wherein the extended availability attribute includes a field indicating whether channel specific further availability information is available.

20. The non-transitory computer readable memory medium of claim 15, wherein the extended availability attribute includes an extended availability entry list, wherein the extended availability entry list includes one or more of:
an entry length field;
a bitmap control field;
an availability intervals bitmap;
an operating class field;
a channel number field; or
an operating mode field.

* * * * *